United States Patent Office 2,950,429
Patented Aug. 23, 1960

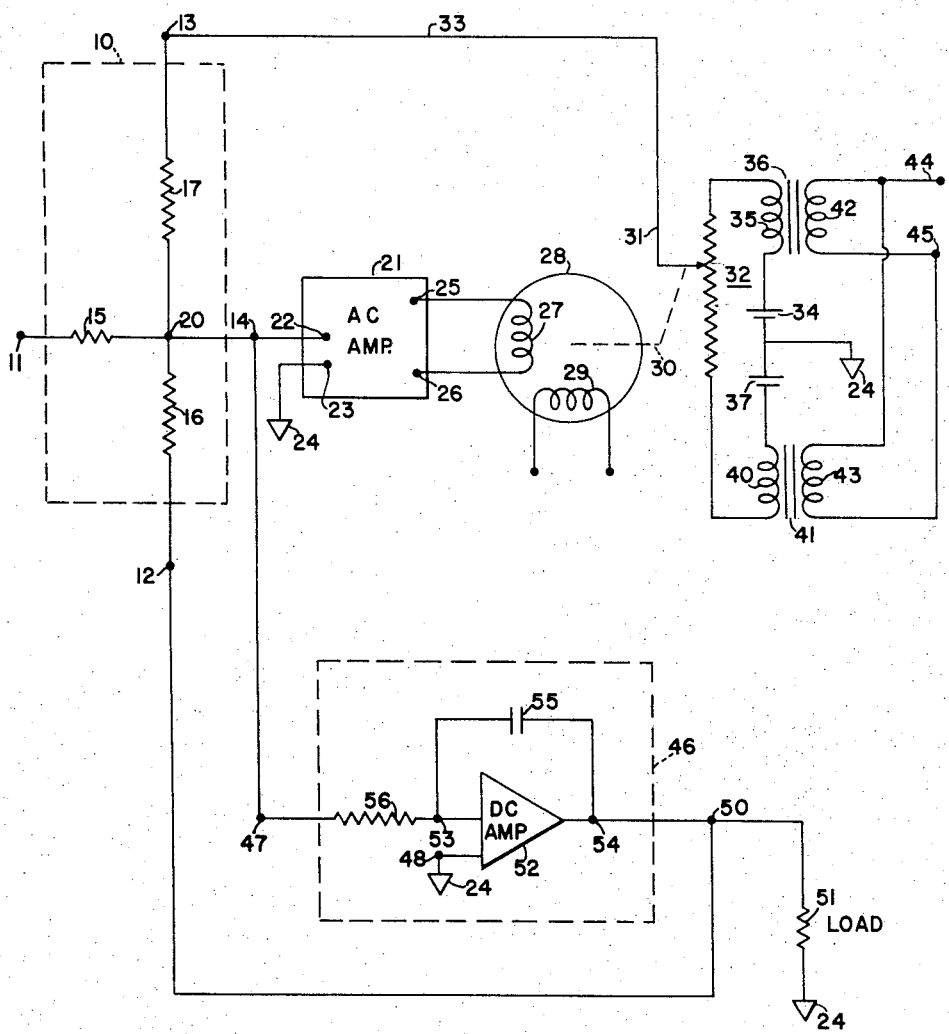
INVENTOR.
HENRY W. BERRY
BY [signature]
ATTORNEY

2,950,429

REBALANCING CONTROL APPARATUS

Henry W. Berry, Largo, Fla., assignor to Minneapolis-Honeywell Regulator Company, Minneapolis, Minn., a corporation of Delaware Filed Apr. 7, 1958, Ser. No. 726,995

3 Claims. (Cl. 318—28)

This invention relates to control apparatus and more specifically to a converter for producing a unidirectional electric voltage of magnitude and polarity corresponding to the magnitude and phase of an alternating electric signal.

In control systems there is frequently posed the problem of converting an alternating voltage signal into a corresponding direct voltage signal. Many schemes have been devised to accomplish such a conversion with more or less success. A very simple method is simply to rectify and filter the alternating voltage and use the resultant direct voltage to control the output of a power amplifier. Such an arrangement is quite satisfactory in applications where a great accuracy is not required, but, if great accuracy is needed, the inherent nonlinearities of the components employed cause this scheme to fall short of the desired results. Other and more accurate arrangements have been devised in which two ganged potentiometers are connected and controlled so that one potentiometer acts as a rebalance element in a servo loop controlled by the alternating input voltage and the other potentiometer, having a direct voltage applied across it, presents as an output signal a direct voltage proportional to the alternating input voltage to be converted. This scheme, of course, exhibits some inherent inaccuracies since no two potentiometers "track" perfectly and since, in addition, the two potentiometers are not always subjected to the same amount of electrical loading.

My invention avoids the difficulties mentioned above by means of an arrangement wherein only one potentiometer is used, this potentiometer having impressed across it superimposed alternating and direct reference voltages. The apparatus operates so that the potentiometer tap is positioned by a servo loop which balances the alternating voltage from the potentiometer against the alternating input signal, the direct voltage on the potentiometer tap being therefore accurately proportional to the alternating input voltage in spite of nonlinearities in the potentiometer. Further means are included to insure that changing loads do not influence the accuracy of the output voltage.

It is accordingly an object of this invention to provide an alternating signal to unidirectional signal converter wherein inaccuracies and nonlinearities of the component parts have little effect on the accuracy of the unidirectional output signal.

A further object of this invention is to provide an alternating signal to unidirectional signal converter wherein varying load conditions have a negligible effect upon the accuracy of conversion.

These and other objects of the invention will be more thoroughly understood through reference to the specification, claims, and the drawing. The drawing shows a circuit of one preferred embodiment of the invention.

*Structure*

In the drawing, a summing network 10 has three input terminals 11, 12, and 13, and has one output terminal 14. Summing network 10 contains three resistors 15, 16, and 17, which are connected, respectively, from terminals 11, 12, and 13 to a junction point 20, which is connected directly to output terminal 14. An A.C. amplifier 21 has an input terminal 22 connected directly to output terminal 14 and has a further input terminal 23 connected to a common point 24. Amplifier 21 also has two output terminals 25 and 26, across which is connected one winding 27 of a motor 28. Motor 28 is shown as a two-phase motor, and thus has a further winding 29, which is normally energized with a voltage in quadrature with any signal appearing on winding 27. A mechanical connection 30 is shown connecting motor 28 to a movable tap 31 of a potentiometer shown generally by the numeral 32. Tap 31 is electrically connected to input terminal 13 of summing network 10 by a conductor 33. A direct voltage source 34 has its negative terminal connected to common point 24 and its positive terminal connected to one end of the secondary winding 35 of a first transformer 36. The other end of winding 35 is connected to one end of the resistive portion 39 of potentiometer 32. Another identical direct voltage source 37 has its positive terminal connected to common point 24 and its negative terminal connected to one end of the secondary winding 40 of a second indentical transformer 41. The other end of winding 40 is connected to the other end of the resistive portion of potentiometer 32. Transformers 36 and 41 have primary windings 42 and 43, respectively, which are connected in parallel with each other and are connected to reference alternating input terminals 44 and 45. The phasing of windings 35 and 40 are such that they add across potentiometer 32.

An electric signal integrator 46 has an input terminal 47 connected directly to output terminal 14 of summing network 10. Integrator 46 also has an output terminal 50, which is connected directly to input terminal 12 of summing network 10. A load 51 is connected between terminal 50 and common point 24. Integrator 46 comprises a D.C. amplifier 52 having an input terminal 53, a common terminal 48 connected to common point 24, and an output terminal 54. A capacitor 55 is connected between output terminal 54 and input terminal 53. Integrator 46 also contains an input resistor 56, which is connected between input terminal 47 and amplifier input terminal 53.

*Operation*

To aid in understanding the overall operation of the converter depicted in the figure, the operation of separate portions of this circuit will first be considered. Summing network 10 is an arrangement well known in the art and has widespread use, especially in conjunction with D.C. amplifiers in analogue computers. Summing network 10 is arranged so that any output signal appearing at terminal 14 is proportional to the algebraic sum of signals applied to input terminals 11, 12, and 13. Thus, when a certain voltage is applied to terminal 11 and another voltage, equal in magnitude but opposite in polarity is applied to terminal 12, no signal being applied at terminal 13, the voltage at output terminal 14 is zero. It is possible also to assign certain "weights" to the several input signals by adjusting the resistance of summing resistors 15, 16, and 17 in inverse relation to the "weights" desired. Should it be desired, for example, that the signal applied to terminal 11 have twice the effect on the output signal that the other input signals have, the resistance of resistor 15 is then made one-half the value of resistors 16 and 17. Any weighting desired can therefore be accomplished by proportioning the individual summing resistors 15, 16, and 17 in an inverse manner. For the purpose of the present illustration, however, the simplest case will be employed; that is, resistors 15, 16, and 17 are equal so that signals applied to terminals 11, 12, and 13 are given equal "weight" in the summing process.

A.C. amplifier 21 is of the type whose output is not affected by any direct signal, but is dependent only upon the alternating component of input signal. This feature may be achieved in an amplifier by its having at least one capacitively coupled or transformer coupled stage, since either of these coupling arrangements transmits only alternating signal components. Such an amplifier, or signal translation device, is desirable in the embodiment of the invention shown in the figure so that motor 28 is controlled only by alternating signals appearing at the output terminal 14 of summing amplifier 10. The importance of this will become clear with further explanation.

Motor 28 is a two-phase motor. In operation, an alternating signal of one phase is applied across winding 29 (by means not shown) and upon application of a further alternating signal across winding 27, this further signal being in quadrature with the signal of winding 29, the motor shaft is caused to turn in one or the other direction depending upon whether the signal of one winding leads or lags the signal of the other winding. In an arrangement as shown, winding 27 is ordinarily referred to as the control phase winding, while winding 29 is referred to as the fixed phase winding.

Potentiometer 32 is of conventional construction, but has applied across it an alternating voltage superimposed upon a direct voltage. In operation, an alternating signal, of the same frequency and in quadrature with that applied to winding 29 of motor 28, is applied to terminals 44 and 45. Thus, direct voltage sources 34 and 37 and transformers 36 and 41 being connected as shown, the voltage at movable tap 31, with respect to common point 24, contains both a direct and an alterntaing component. When tap 31 is perfectly centered along the resistive portion 39 of potentiometer 32, no voltage appears thereon. However, when tap 31 is moved to either side of this exact center, a voltage appears thereon having a certain direct component and an additional alternating component. Further, the magnitudes of the direct and alternating components are always in direct proportion, regardless of the position of tap 31; and the phase of the alternating component always corresponds to a given polarity of direct component, regardless of the position of tap 31. Upon consideration it will be noted that non-linearities in the resistive portion of potentiometer 32 can have no effect whatsoever on the proportionality of direct and alternating component magnitudes appearing at movable tap 31, for any irregularities in potentiometer 32 have an identical effect on both the alternating and the direct signal components. This is important, for it assures that a given alternating component on tap 31 always corresponds precisely to a corresponding direct component thereon.

Integrator 46 is shown to be of the feedback amplifier type, but any integrating arrangement is suitable in this position so long as it performs the desired function. The desired function is to integrate any voltage applied to input terminal 47 with respect to time and produce an output signal at terminal 50 which is proportional in magnitude to the time integral of the input signal and of opposite polarity. Capacitor 55 is the conventional feedback capacitor of an integrating operational amplifier.

As to operation of the converter as a whole, it is seen first that movable tap 31 of potentiometer 32 is correctly positioned in accordance with any alternating signal applied to terminal 11, this action taking place through operation of an alternating signal servo loop which includes amplifier 21, motor 28, potentiometer 32, and summing network 10. In more detail, let there be applied across terminals 44 and 45 (by means not shown) an alternating signal of frequency corresponding to the frequency of an alternating signal to be converted applied at terminal 11. Let there further be an alternating signal applied across winding 29 (by means not shown) which is in quadrature with the signal applied to the terminals 44 and 45. Then any alternating signal applied to terminal 11 causes amplifier 21 to energize motor 28, which in turn moves tap 31 in the correct direction to balance the loop. Since the signal on tap 31 is applied to input terminal 13 of summing network 10, motor 28 will continue to operate until the alternating component of the signal applied at terminal 13 is equal in magnitude but opposite in phase to the signal to be converted applied at input terminal 11. When this condition is fulfilled, substantially no alternating signal component appears at summing network output terminal 14, and motor 28 therefore is no longer energized. The servo loop is at this point satisfied, that is, is rebalanced. It is clear, of course, that the position of movable tap 31 will continuously be adjusted in accordance with the magnitude and phase of the alternating signal applied to converter input terminal 11.

The above operation having been established, it should now be noted that summing network output terminal 14 is also connected to input 47 of integrator 46. Integrator 46 therefore presents an output signal corresponding in magnitude to the time integral of any direct voltage signal appearing at summing network output terminal 14, but of opposite polarity. As pointed out above, when the servo loop is balanced there is no alternating voltage present at terminal 14. However, the direct voltage component of potentiometer tap 31 is still being applied to summing network 10 at terminal 13, so that a direct voltage component does appear at terminal 14 at this time. It will be noted further, however, that the output of integrator 46 is applied as an input to summing network 10 at input terminal 12. Since the output of integrator 46 is a voltage opposite in polarity to the input voltage applied thereto, this output voltage applied to summing input terminal 12 tends to cancel the direct voltage at output terminal 14 due to the direct voltage component applied to summing network input 13. Further, when the output voltage of integrator 46 equals the magnitude of the direct voltage applied to summing network input terminal 13, the direct voltage present at output terminal 14 is substantially equal to zero. At this point the input to integrator 46 is also substantially zero, and therefore no further change occurs in its output at output terminal 50. The voltage presented to load 51 is therefore directly proportional to the direct voltage component on potentiometer tap 31, which in turn is directly proportional to the alternating voltage applied to converter input terminal 11. The direct voltage output of the converter is therefore proportional to the alternating voltage input, with no error introduced as a result of nonlinearity in potentiometer 32 and including only errors due to offsets in the servo and the integrator. These errors may be made small by techniques well known in the art.

It is important further to note that when the output of summing network 10 at terminal 14 equals zero, that is, is at the same potential as common point 24, that the load presented to potentiometer 32 at movable tap 31 is exactly the same for the alternating voltage component as it is for the direct voltage component, and that this load is equal for practical purposes to the resistance of summing resistor 17 of summing network 10. Since the load is identical with respect to both the alternating and the direct voltage components present at movable tap 31, a further source of error is eliminated in this converter. It is apparent that were the loading of potentiometer 32 different for the alternating component than for the direct component of voltage, the direct voltage output of the converter would not necessarily correspond precisely to the alternating voltage input. This possible source of error is, however, almost completely eliminated in my invention.

Many changes and modifications will undoubtedly occur to those skilled in the art, and I therefore wish to be understood that the scope of my invention is to be limited only by the appended claims and not by the embodiment presented here for the purpose only of illustration.

I claim:

1. A converter for producing a unidirectional electric signal of magnitude and polarity corresponding to the magnitude and phase, respectively, of an alternating electric signal, comprising: a potentiometer having a movable tap; a reference source of alternating voltage; a reference source of direct voltage; means connected to said potentiometer and to said reference sources for superimposing and applying across said potentiometer said alternating and direct voltages; a summing network having at least first, second, and third input terminals and an output terminal, said first input terminal providing an input point for applying an alternating signal to be converted; means electrically connecting the movable tap of said potentiometer to said second input terminal; electric motor means mechanically connected to said movable tap to vary the position thereof; alternating signal responsive means connected to the output terminal of said summing network and to said motor means so that said motor means is energized in accordance with any alternating signal present at the output terminal of said summing network; integrating means having an input terminal and an output terminal; means connecting the output terminal of said summing network to the input terminal of said integrating means; and means connecting the output terminal of said integrating means to the third input terminal of said summing network; the output terminal of said integrator means serving also as an output terminal of said converter.

2. An alternating signal to unidirectional signal converter comprising: electrical signal summing means producing an output signal representative of the algebraic sum of input signals supplied thereto; means connected to said summing means for applying as an input thereto an alternating signal to be converted; potentiometer means having a movable tap; means connected to said potentiometer means for applying an alternating voltage superimposed upon a direct voltage to said potentiometer means; means applying the potential appearing on said movable tap as an input to said summing means; electromechanical transducer means connected in controlling relation to said movable tap; means applying the output signal of said summing means to said transducer means; electric signal integrating means producing an output signal representative of the time integral of an input signal applied thereto; means applying the output signal of said summing means as an input to said integrator means; and means applying the output signal of said integrator means as an input to said summing means, the output signal of said integrator means being also the output signal of said converter.

3. In combination: a summation point; means supplying to said summation an alternating signal voltage of variable amplitude and reversible phase; adjustable means for supplying a reference signal having a unidirectional component of variable magnitude and reversible polarity and an alternating component of variable amplitude and reversible phase, said magnitude and said amplitude varying together and said polarity and said phase reversing together: means supplying said reference signal to said summation point, including means connected to said summation point for adjusting said adjustable means until the alternating voltage at said summation point is zero; and means for supplying to said reference point a direct voltage which varies in magnitude and reverses in polarity with said unidirectional component of said reference signal, whereby to reduce the direct voltage at said summation point to zero, so that the output of the last named means is a direct voltage determined in magnitude and polarity by the amplitude and phase of said signal voltage.

References Cited in the file of this patent

UNITED STATES PATENTS 2,812,482   Gray ------------------ Nov. 5, 1957